(12) United States Patent
Bair et al.

(10) Patent No.: US 8,491,770 B2
(45) Date of Patent: Jul. 23, 2013

(54) CATHODIC ELECTROCOATING COMPOSITIONS

(75) Inventors: Stephen Neal Bair, Newark, DE (US); Simona Percec, Philadelphia, PA (US); Susan H. Tilford, Ewing, NJ (US)

(73) Assignee: Axalta Coating Systems IP Co. LLC DE (US)

( * ) Notice: Subject to any disclaimer, the term of this patent is extended or adjusted under 35 U.S.C. 154(b) by 315 days.

(21) Appl. No.: 12/964,864

(22) Filed: Dec. 10, 2010

(65) Prior Publication Data

US 2012/0145545 A1 Jun. 14, 2012

(51) Int. Cl.
*C09D 5/44* (2006.01)
*C08F 226/02* (2006.01)
*C08F 236/02* (2006.01)
*C08F 236/22* (2006.01)

(52) U.S. Cl.
USPC ........... 204/500; 204/499; 204/506; 526/304; 526/277; 526/303.1; 526/306; 526/307.2; 526/307.8; 526/307.6; 524/547; 524/555; 525/379

(58) Field of Classification Search
USPC ............... 204/500, 506, 499; 526/304, 277, 526/303.1, 306, 307.25, 307.8, 307.6; 524/547, 524/555; 525/379
See application file for complete search history.

(56) References Cited

U.S. PATENT DOCUMENTS

| 3,157,595 | A | * | 11/1964 | Johnson et al. ............... 210/734 |
| 4,412,043 | A | * | 10/1983 | Pazos ........................ 525/328.2 |
| 4,412,943 | A | | 11/1983 | Pazos |
| 5,093,429 | A | | 3/1992 | Patrice |
| 5,498,785 | A | * | 3/1996 | Wang et al. ................... 525/371 |
| 6,207,731 | B1 | | 3/2001 | Gam |
| 7,504,555 | B2 | | 3/2009 | Grosse-Brinkhaus et al. |

FOREIGN PATENT DOCUMENTS

| FR | 2649709 | 1/1991 |
| WO | 2009/046270 | 4/2009 |
| WO | 2010/036273 | 4/2010 |

OTHER PUBLICATIONS

Xu, Carbohydrate Polymers, 68 (2007) 416-423.*
Abramyan et al., Lakokrasochnye Materialy I Ikh Primenenie, 1, 18-20, 1971, abstract.

* cited by examiner

*Primary Examiner* — Robert C Boyle

(57) ABSTRACT

Disclosed herein are functionalized polymers comprising ethylene and substituted ethylene segments. These functionalized polymers are useful as film forming resins in cathodic electrocoating compositions. Also disclosed herein are aqueous dispersion compositions comprising the functionalized polymers and a process for coating various electrically conductive substrates.

25 Claims, No Drawings

CATHODIC ELECTROCOATING COMPOSITIONS

FIELD OF THE INVENTION

The invention relates to the field of electrocoating compositions. More specifically, the invention relates to cathodic electrocoating compositions containing functionalized polymers comprising ethylene and substituted ethylene segments.

BACKGROUND

The coating of electrically conductive substrates by an electrodeposition process, also called an electrocoating process, is a well-known and important industrial process. For example, electrodeposition of primers on metal automotive substrates is widely used in the automotive industry. In this process, a conductive article, such as an autobody or an auto part, is immersed in a bath of an aqueous emulsion of film forming polymer and the article acts as an electrode in the electrodeposition process. An electric current is passed between the article and a counter-electrode in electrical contact with the coating composition until a coating is deposited on the article. In a cathodic electrocoating process, the article to be coated is the cathode and the counter-electrode is the anode.

Film forming resin compositions used in the bath of a typical cathodic electrodeposition process also are well known in the art and have been in use since the 1970's. These resins typically are made from polyepoxide resins that have been chain extended with an amine compound(s). The epoxy amine adduct is then neutralized with an acid compound to form a water soluble or water dispersible resin. These resins are blended with a crosslinking agent, usually a polyisocyanate, and dispersed in water to form a water emulsion.

Currently, cathodic electrodeposition is the preferred method used by the automotive industry. However, there is still a need for improved electrocoating compositions that require lower baking temperatures, and result in coatings having improved UV stability and improved resistance to chipping.

SUMMARY

The present invention addresses the above needs by providing cathodic electrocoating compositions containing novel functionalized polymers comprising ethylene and substituted ethylene segments.

In one aspect, the invention is a polymer comprising:
a) at least one ethylene segment of structure 1

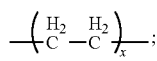

Structure 1 b) at least one substituted ethylene segment of structure 2

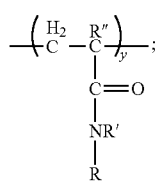

Structure 2 and
c) at least one substituted ethylene segment of structure 3

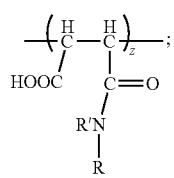

Structure 3 wherein: x and Y are integers from 10 to 30,000 and z is an integer from 1 to 10;

R' is H, $-C_qH_{2q+1}$ or $-C_qH_{2q-k}$; R" is H or $CH_3$; and
each R is independently at least one member selected from the group consisting of: $-(CH_2)_mN(CH_3)_2$, $-(CH_2)_n-(CH=CH)-(CH_2)_rCH_3$, $-(CH_2)_vCH_3$, $-(CH_2)_pOH$, $-(CH_2)_sN(CH_2CH_2OH)_2$, and $-(CH_2)_tOPO_3H_2$, where q, r, s, t, m, n, v, and p are independently selected from the group of integers from 1 to 20, and k is the number of rings in $-C_qH_{2q-k}$.

In another aspect, the invention is an aqueous dispersion composition comprising:
a) a functionalized polymer as disclosed herein; and
b) water;
wherein said aqueous dispersion composition has a pH of 5.0 to 7.0.

In another aspect, the invention is a process comprising the steps of:
a) providing an electrochemical cell comprising:
  i) an aqueous dispersion composition as disclosed herein;
  ii) a substrate to be coated, wherein the substrate is in contact with the aqueous dispersion composition and the substrate serves as a cathode of the electrochemical cell;
  iii) an anode in contact with the aqueous dispersion composition; and
  iv) a power supply in electrical contact with the anode and cathode; and
b) applying a voltage between the cathode and the anode to electrodeposit a polymer coating onto at least a portion of the substrate.

In another aspect, the invention is an article produced by the process disclosed herein.

DETAILED DESCRIPTION

Disclosed herein are novel functionalized polymers, which are useful as film forming resins in cathodic electrocoating compositions. The polymers, which comprise ethylene and substituted ethylene segments, are functionalized to make them dispersible in water and to enable cathodic electrodeposition. Also disclosed herein are aqueous dispersion compositions comprising the functionalized polymers and a process for coating various electrically conductive substrates. The functionalized polymer coating on the substrate provides enhanced corrosion protection.

Polymer Compositions

The functionalized polymers disclosed herein comprise:
a) at least one ethylene segment of structure 1;

(1)

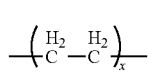

b) at least one substituted ethylene segment of structure 2;

(2)

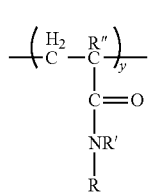

and c) at least one substituted ethylene segment of structure 3;

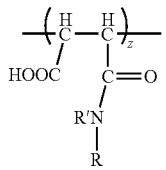
(3)

wherein: x and y are integers from 10 to 30,000 and z is an integer from 1 to 10; R' is H, —$C_qH_{2q+1}$ (alkyl) or —$C_qH_{2q-k}$ (cycloalkyl); R" is H or $CH_3$; and each R is independently at least one member selected from the group consisting of —$(CH_2)_mN(CH_3)_2$, —$(CH_2)_n$—(CH=CH)—$(CH_2)_rCH_3$, —$(CH_2)_nCH_3$, —$(CH_2)_pOH$, —$(CH_2)_sN(CH_2CH_2OH)_2$, and —$(CH_2)_tOPO_3H_2$, where q, r, s, t, m, n, v, and p are independently selected from the group of integers from 1 to 20 and k is the number of rings in —$C_qH_{2q-k}$.

In one embodiment, R' is H, and R is —$(CH_2)_mN(CH_3)_2$, —$(CH_2)_n$—(CH=CH)—$(CH_2)_rCH_3$, and —$(CH_2)_pOH$ in the substituted ethylene segment of structure 2 and in the substituted ethylene segment of structure 3.

In another embodiment, R' is H, and R is —$(CH_2)_mN(CH_3)_2$, —$(CH_2)_n$—(CH=CH)—$(CH_2)_rCH_3$, and —$(CH_2)_pOH$ in the substituted ethylene segment of structure 2 and in the substituted ethylene segment of structure 3, and m=3, n=8, r=7, and p=2.

In another embodiment, R' is H, and R is —$(CH_2)_n$—(CH=CH)—$(CH_2)_rCH_3$ and —$(CH_2)_pOH$ in the substituted ethylene segment of structure 2 and in the substituted ethylene segment of structure 3.

In another embodiment, R' is H, and R is —$(CH_2)_n$—(CH=CH)—$(CH_2)_rCH_3$ and —$(CH_2)_pOH$ in the substituted ethylene segment of structure 2 and in the substituted ethylene segment of structure 3, and n=8, r=7, and p=2.

In another embodiment, R' is H, and R is —$(CH_2)_n$—(CH=CH)—$(CH_2)_rCH_3$ and —$(CH_2)_sN(CH_2CH_2OH)_2$ in the substituted ethylene segment of structure 2 and in the substituted ethylene segment of structure 3.

In another embodiment, R' is H, and R is —$(CH_2)_n$—(CH=CH)—$(CH_2)_rCH_3$ and —$(CH_2)_sN(CH_2CH_2OH)_2$ in the substituted ethylene segment of structure 2 and in the substituted ethylene segment of structure 3 and n=8, r=7, and s=3.

In another embodiment, R' is H, and R is —$(CH_2)_mN(CH_3)_2$ and —$(CH_2)_pOH$ in the substituted ethylene segment of structure 2 and in the substituted ethylene segment of structure 3.

In another embodiment, R' is H, and R is —$(CH_2)_mN(CH_3)_2$ and —$(CH_2)_pOH$ in the substituted ethylene segment of structure 2 and in the substituted ethylene segment of structure 3 and wherein m=3, and p=2.

In another embodiment, R' is —$C_qH_{2q+1}$ and R is —$(CH_2)_pOH$ in the substituted ethylene segment of structure 2 and in the substituted ethylene segment of structure 3.

In another embodiment, R' is —$C_qH_{2q+1}$ and R is —$(CH_2)_pOH$ in the substituted ethylene segment of structure 2 and in the substituted ethylene segment of structure 3 and q=2 and p=2.

In another embodiment, R' is H, and R is —$(CH_2)_tOPO_3H_2$ in the substituted ethylene segment of structure 2 and in the substituted ethylene segment of structure 3.

In another embodiment, R' is H, and R is —$(CH_2)_tOPO_3H_2$ in the substituted ethylene segment of structure 2 and in the substituted ethylene segment of structure 3 and t=2.

The functionalized polymers disclosed herein may be prepared by chemical modification of random or block copolymers comprising ethylene, and substituted ethylene segments (i.e., acrylate alkyl ester, and maleic anhydride segments). Specifically, these random and block copolymers comprise:

i) at least one ethylene segment of structure A;

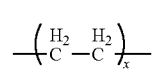
Structure A ii) at least one substituted ethylene segment of structure B;

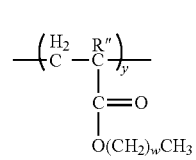
Structure B and iii) at least one substituted ethylene segment of structure C;

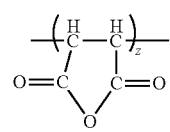
Structure C wherein: x and y are integers from 10 to 30,000, z is an integer from 1 to 10, w is an integer from 0 to 3, and R" is H or $CH_3$.

In some embodiments, the copolymer comprises about 15 to 59.5 wt % (percent by weight) of structure A, about 40 to 75 wt % of structure B, and about 0.5 to 10 wt % of structure C. In other embodiments, the copolymer comprises about 25 to 49.5 wt % of structure A, about 50 to 70 wt % of structure B, and about 0.5 to 5 wt % of structure C.

Suitable copolymers comprising these segments may be prepared using methods known in the art. For example, the copolymers may be prepared by free radical-initiated emulsion polymerization, or bulk or solution polymerization in the presence of organic hydroperoxides, peroxides, diazo compounds, or the like (see for example, Greene, U.S. Pat. No. 3,904,588; and Wu et al., U.S. Pat. No. 7,608,675). As an alternative to preparing the starting copolymer, Vamac® ethylene acrylic elastomers, sold by E. I. du Pont de Nemours and Co. (Wilmington, Del.), can be used.

The functionalized polymers disclosed herein can be prepared by reacting the starting copolymer with various primary or secondary amine containing-compounds. Suitable amine-containing compounds include, but are not limited to, R'NH$(CH_2)_mN(CH_3)_2$, R'NH$(CH_2)_n$—(CH=CH)—$(CH_2)_rCH_3$, R'NH$(CH_2)_vCH_3$, R'NH$(CH_2)_pOH$, R'NH$(CH_2)_sN(CH_2CH_2OH)_2$, and R'NH$(CH_2)_tOPO_3H_2$, where R' is H, —$C_qH_{2q+1}$ (alkyl) or —$C_qH_{2q-k}$ (cycloalkyl), and q, r, s, t, m, n, v, and p are independently selected from the group of integers from 1 to 20 and k is the number of rings in —$C_qH_{2q-k}$. Combinations of two or more amine-containing compounds may be used.

In one embodiment, a combination of oleylamine, 3-dimethyl-1-propylamine, and ethanolamine is used to functionalize the starting copolymer.

In another embodiment, a combination of oleylamine and N-(3-aminopropyl)diethanolamine is used to functionalize the starting copolymer.

In another embodiment, a combination of ethanolamine and 3-dimethyl-1-propylamine is used to functionalize the starting copolymer.

In another embodiment, 2-(ethylamino)ethanol is used to functionalize the starting copolymer.

In another embodiment, a combination of oleylamine and ethanolamine is used to functionalize the starting copolymer.

The functionalized polymer can be prepared by combining the starting copolymer with at least one amine-containing compound and a suitable catalyst in a solvent, such as methyl isobutyl ketone, diisobutyl ketone, methyl ethyl ketone, toluene, xylene, trichloroethylene, dichlorobenzene, and mixtures thereof. Suitable catalysts include, but are not limited to, diazabicylco[2.2.2]octane, tertiary amines, hindered secondary amines, and bifunctional derivatives such as imidazoles and 8-hydroxyquinoline. The resulting mixture is stirred for a time sufficient to obtain the desired degree of functionalization. The reaction mixture may be heated to increase the rate of reaction. The mixture may be further heated to remove volatile components and the functionalized polymer may be recovered using methods known in the art, such as precipitation. The degree of functionalization of the product can be determined using methods known in the art, such as infrared (IR) spectrometry, proton nuclear magnetic resonance ($^1$H NMR) spectroscopy, and carbon nuclear magnetic resonance ($^{13}$C NMR) spectroscopy. In one embodiment, the degree of functionalization is at least 10 mol %.

The functionalized polymer may also be prepared using a batch kneading process. In this embodiment, the reaction is conveniently carried out in a kneader/reactor. Suitable kneader/reactors are known in the art and are available from companies such as LIST AG (Arisdorf, Switzerland). Kneader/reactors are specifically designed to handle highly viscous, sticky, and pasty materials as they provide intensive mixing and kneading action, referred to herein as "agitation". Kneader/reactors typically are made of stainless steel, are jacketed for temperature control, and have ports for introducing polymer and other reactants, application of vacuum, and introducing purge gases. Agitation in the kneader/reactor is typically accomplished by means of impellers and hooks/baffles which are attached to the walls of the kneader/reactor.

The starting polymer comprising structures A, B, and C, as defined above, is provided as a solid, for example in a kneader/reactor, and then is heated to a temperature sufficient to soften the polymer. The temperature needed is dependent on the particular polymer used and is readily determined by one skilled in the art using routine experimentation. Typically for the polymers disclosed herein, the temperature is in the range of about 70° C. to about 100° C. Then, at least one amine-containing compound, as described above, is added to the softened polymer to form a mixture. In this embodiment, the use of a catalyst is optional; a catalyst is not required. If a catalyst is used, one may be chosen from those listed above. The mixture is agitated and heated for a combination of time and temperature sufficient to form a functionalized polymer comprising structures 1, 2, and 3, as defined above. Typically, the mixture is agitated and heated at a temperature of about 100° C. to about 270° C., more particularly, about 100° C. to about 125° C. Generally, shorter reaction times are used at higher temperatures, as is known in the art. In one embodiment, the mixture is heated to a temperature of about 100° C. to about 125° C. for 4 to 6 hours. Then, the resulting functionalized polymer is recovered, e.g., removed from the kneader/reactor by opening a bottom drain valve and applying pressure with an inert gas, such as nitrogen, above the polymer so that it will flow out of the kneader/reactor.

For large scale production, the functionalized polymer may be prepared in a continuous process using a continuous kneader or extruder.

Aqueous Dispersion Composition

An aqueous dispersion of the functionalized polymers disclosed herein can be prepared by adding the functionalized polymer to water and adjusting the pH to about 5.0 to 7.0, more particularly, about 6.0 to 7.0, and more particularly, about 6.5 to 7.0, with the addition of an acid. Suitable acids include, but are not limited to, acetic acid, sulfonic acid, formic acid, phosphoric acid, and fatty acids, such as lauryl acid. The term "aqueous dispersion", as used herein, refers to a two-phase system in which solid particles are dispersed in an aqueous solution. The dispersing agent for the disclosed functionalized polymers is water; however, small amounts of volatile organic solvents may be present. Typically, the aqueous dispersion comprises about 5% to about 50% by weight of the functionalized polymer. The resulting mixture is stirred using methods and apparatus known in the art, such as stirred tanks, stirred mills, static mixers, and the like. The mixture may be heated to aid in the formation of the dispersion.

The aqueous dispersion can also be prepared using a phase inversion process, wherein the functionalized polymer is first dissolved in an organic solvent, such as methyl isobutyl ketone. The resulting solution is then poured into an acidified aqueous solution having a pH of about 5.0 to 7.0, more particularly, about 6.0 to 7.0, and more particularly, about 6.5 to 7.0, with high speed mixing. The methyl isobutyl ketone is removed using methods known in the art, such as evaporation, to yield the aqueous dispersion.

The aqueous dispersion may further comprise at least one crosslinking agent. Suitable crosslinking agents are known in the art, and include, but are not limited to, blocked isocyanates, melamine-formaldehyde resins, tris(alkoxycarbonylamino)triazines, alkoxysilanes, and polyepoxides. In some embodiments, a blocked isocyanate crosslinking agent is used. Isocyanate crosslinking agents and blocking agents are well known in the art (see for example Wismer et al., U.S. Pat. No. 4,419,467). Suitable isocyanate crosslinking agents include, but are not limited to, aliphatic, cycloaliphatic and aromatic isocyanates such as hexamethylene diisocyanate, cyclohexylene diisocyanate, tolylene-2,4-diisocyanate, 4,4'-methylene diphenyl diisocyanate, and the like. These isocyanates are pre-reacted with a blocking agent such as oximes, alcohols, or caprolactams which block the isocyanate functionality, i.e., the crosslinking functionality. Upon heating the blocking agents dissociate, thereby providing a reactive isocyanate group and crosslinking occurs. In some embodiments, the blocked isocyanate crosslinking agent is an alcohol blocked, methylene diphenyl diisocyanate, as described by Gam (U.S. Pat. No. 6,207,731). In some embodiments, the crosslinking agent is an alkoxysilane, such as 3-(isocyanatopropyl)triethoxysilane. The aqueous dispersion generally contains about 10% to about 50%, more particularly, about 30% to about 40% by weight of the functionalized polymer and the crosslinking agent. The aqueous dispersion may be further diluted with water when added to an electrocoating bath to give a range of about 10% to about 30% by weight of the functionalized polymer and the crosslinking agent.

The aqueous dispersion may further comprise other optional additives, if desirable. Optional additives can include, for example, surfactants, pigments, light stabilizers, anti-crater agents, flow aids, dispersion stabilizers, adhesion promoters, corrosion inhibitors, and fillers.

Examples of surfactants include alkoxylated styrenated phenols, such as, for example, SYNFAC® 8334, available from Milliken Chemical Company, Spartanburg, S.C.; alkyl imidazoline surfactants; and nonionic surfactants such as, for example, SURFYNOL® surfactants, available from Air Products, Allentown, Pa. Combinations of surfactants can also be used.

The aqueous dispersion may also comprise at least one pigment. Pigments for use herein may be selected from color pigments, effect pigments, electrically conductive pigments, magnetically shielding pigments, extender pigments, and anti-corrosion pigments. Examples of useful pigments include, but are not limited to, titanium dioxide, ferric oxide, red iron oxide, transparent red iron oxide, black iron oxide, brown iron oxide, chromium oxide green, carbon black, aluminum silicate, precipitated barium sulfate and combinations thereof.

Light stabilizers, such as, for example, hindered amine light stabilizers can be added to the aqueous dispersion composition. Representative commercially available hindered amine light stabilizers can be, for example, TINUVIN® 770, 292 and 440 which are sold by Ciba Specialty Chemicals Corporation.

The aqueous dispersion composition may also comprise at least one anti-crater agent. Anti-crater agents are well known in the art; examples are given by Chung (U.S. Pat. No. 5,789, 468), Gam (U.S. Pat. Nos. 5,908,910, and 6,207,731), and Gam et al. (U.S. Pat. No. 7,264,706).

Flow aids include materials such as, for example, ethylene and/or propylene adducts of nonyl phenols or bisphenols.

Process for Coating a Substrate

The aqueous dispersion disclosed herein can be used in a conventional cathodic electrocoating process to coat a substrate. Accordingly, in one embodiment, the invention provides a process for coating a substrate comprising the steps of:
(a) providing an electrochemical cell comprising:
  (i) an aqueous dispersion as described above;
  (ii) a substrate to be coated, wherein the substrate is in contact with the aqueous dispersion and the substrate serves as a cathode of the electrochemical cell;
  (iii) an anode in contact with the aqueous dispersion; and
  (iv) a power supply in electrical contact with the anode and cathode; and
(b) applying a voltage between the cathode and the anode to electrodeposit a polymer coating onto at least a portion of the substrate.

In one embodiment, the substrate is partially immersed in the aqueous dispersion. In another embodiment, the entire substrate is immersed in the aqueous dispersion.

Useful substrates that can be coated using the process disclosed herein are electrically conductive substrates including, but not limited to, metallic materials, for example ferrous metals such as iron, steel, and alloys thereof, non-ferrous metals such as aluminum, zinc, magnesium and alloys thereof, and combinations thereof. In some embodiments, the substrate is cold-rolled steel, zinc-coated steel, aluminum or magnesium.

The voltages that are applied in the process vary depending on the type of coating and on the coating thickness desired and may be as low as 1 volt or as high as several thousand volts. Typical voltages used are between 50 to 500 volts. The current density can vary in the range from 1 ampere per square meter to 150 amperes per square meter. The process is typically carried out at a temperature between 25° C. to about 40° C. The time required for the process will vary depending on the desired thickness of the polymer coating.

After the polymer coating has been deposited onto the substrate, the resulting coated substrate is removed from the aqueous dispersion. The coated substrate can optionally be rinsed and then the polymer coating is cured by baking at elevated temperature, such as 150 to 250° C., for a time sufficient to cure the coating. Heating may be done using any means known in the art, such as heating in a baking oven, with a bank of infrared lamps, or a combination thereof.

The thickness of the dried and cured polymer coating is typically between 12 to 50 microns, more particularly, between 15 to 45 microns.

The substrate that is coated with the dried and cured polymer coating can be used as is or additional layers of coating compositions can be applied thereon. In the manufacture of automobiles and other consumer goods, the cured polymer coating can be further coated with one or more of commercially available primers, primer surfacers, sealers, basecoat compositions, clearcoat compositions, glossy topcoat compositions and any combination thereof.

The coated substrates can be various articles used as components to fabricate automotive vehicles, automobile bodies, any and all items manufactured and painted, such as, for example, frame rails, commercial trucks and truck bodies, including but not limited to beverage truck bodies, utility truck bodies, ready mix concrete delivery vehicle bodies, waste hauling vehicle bodies, and fire and emergency vehicle bodies, as well as any potential attachments or components to such truck bodies, buses, farm and construction equipment, truck caps and covers, commercial trailers, consumer trailers, recreational vehicles, including but not limited to, motor homes, campers, conversion vans, vans, pleasure vehicles, pleasure craft, snow mobiles, all terrain vehicles, personal watercraft, motorcycles, boats, and aircraft. The substrate further includes industrial and commercial new construction components; walls of commercial and residential structures, such as office buildings and homes; amusement park equipment; marine surfaces; outdoor structures, such as bridges, towers; coil coating; railroad cars; machinery; OEM tools; signage; sporting goods; and sporting equipment. The substrates can have any shape, for example, in the form of automotive body components, such as bodies (frames), hoods, doors, fenders, bumpers and/or trim, for automotive vehicles.

EXAMPLES

The present invention is further defined in the following Examples. It should be understood that these Examples, while indicating preferred embodiments of the invention, are given by way of illustration only. From the above discussion and these Examples, one skilled in the art can ascertain the essential characteristics of this invention, and without departing from the spirit and scope thereof, can make various changes and modifications of the invention to adapt it to various uses and conditions.

The meaning of abbreviations used is as follows: "min" means minute(s), "hr" means hour(s), "sec" means second(s), "L" means liter(s), "mL" means milliliter(s), "µL" means microliter(s), "g" means gram(s), "mg" means milligram(s), "µg" means microgram(s), "mol" means mole(s), "mmol" means millimole(s), "cm" means centimeter(s), "mm" means millimeter(s), "µm" means micrometer(s), "mils" means thousandths of an inch, "M" means molar concentration, "wt %" means percent by weight, "V" means volt(s), "rpm" means revolutions per minute.

Reagents

Vamac® G ethylene acrylic elastomer was obtained from E. I. du Pont de Nemours and Co. (Wilmington, Del.). All other reagents were obtained from Sigma-Aldrich (St Louis, Mo.) unless otherwise noted.

Example 1

Reaction of Vamac® G with Oleyl Amine,
3-Dimethylamino-1-propylamine and Ethanolamine Vamac® G ethylene acrylic elastomer (30 g) was placed under nitrogen in a 3-neck 250 mL flask fitted with a reflux condenser, Dean-Stark trap and overhead stirrer, and dissolved in 100 g of methyl isobutyl ketone (MIBK), purchased from Alfa Aesar, Ward Hill, Mass. 1,4-Diazabicyclo[2.2.2] octane (DABCO, 25.76 g, purchased from Alfa Aesar) was added to the flask with stirring. A mixture of ethanolamine (5.62 g), oleylamine (30.76 g, obtained from Acros Organics USA, Morris Plains, N.J.), and 3-dimethylamino-1-propylamine (2.35 g) was added over 5 min using a pipette. The resulting mixture was heterogeneous at room temperature, but became homogeneous at reflux. The solution was stirred overnight and refluxed for 8 hr the next day. The bath was heated to 150° C. (for about 30 min) to remove water and methanol via the Dean Stark trap; then the temperature was reduced to 145° C. The mixture was added to a methanol solution containing 0.37 wt % HCl in a blender in order to precipitate out the product. The volume ratio of methanol solution to MIBK was 8:1. This process was repeated one time, resulting in the formation of a gummy polymer. The solvent was decanted away from the gummy polymer, which was then washed with deionized water, blended in water, and then decanted. The polymer was redissolved in a minimal amount of tetrahydrofuran (~35 mL) and precipitated into deionized water. The final product was dried overnight under vacuum to yield 26.3 g of grafted polymer A.

Formation of grafted polymer A was verified using $^{13}C$ and $^{1}H$ NMR, and IR spectroscopic methods. For the IR analysis, the decrease in intensity of the C=O peak at 1738 $cm^{-1}$ and the appearance of amide peaks at 3300 and 1660 $cm^{-1}$ were used to confirm the formation of the functionalized polymer.

Example 2

Dispersion of Grafted Polymer A in Water

Approximately 100 g of deionized water containing 15.3 g of grafted polymer A, made according to Example 1, was brought to a boil in a 500 mL beaker with a watch glass covering. Acetic acid (0.2 g, purchased from EMD Chemicals, Gibbstown, N.J.) was added to the beaker and the resulting aqueous mixture was allowed to reflux for at least 2 hr. A second portion of acetic acid (0.11 g) was added, followed by an additional 3 hr of reflux. Somewhat gelatinous material was observed, so additional acetic acid (0.1 g) was added with continued reflux. Glass slides dipped into the dispersion of polymer A appeared to have a "thick film" on them. After the dispersion sat overnight, no film was observed on glass slides dipped into the dispersion. The final pH of the dispersion of polymer A was ~6, as indicated by test strips.

Example 3

Cathodic Electrodeposition of Grafted Polymer A

A dispersion of grafted polymer A, prepared as described in Example 2, was filtered successively through 25, 11, 8, and 6 μm filters and then through 2.7 μm filter paper.

Cathodic electrodeposition of grafted polymer A was carried out using a zirconium oxide-treated steel plate (15 cm×7 cm) as the cathode, a stainless steel plate as the anode, and the filtered polymer solution as the electrolyte medium. The ratio of the area of the cathode to the area of the anode was 4:1. The cathode-to-anode distance was 3 inches (7.6 cm). The temperature of the electrocoating bath was 22° C. A 23 mm Teflon®-coated paddle, centrally located in the one liter cylindrical coating container, was used to stir the dispersion of grafted polymer A. The amperage was set at a maximum value of 0.5 amps, but the actual value attained was less than the set value. The voltage was increased from 0 to 100 V over a period of 15 sec (the "ramp time"). The "dwell time," or period of constant voltage, was 180 sec. The polymer-coated, zirconium oxide-treated steel plate was removed from the bath, rinsed thoroughly under a strong flush of water, hung to dry for 10 to 15 min, and then baked at 180° C. for 20 min. The polymer film thickness was determined using a Fischerscope instrument (Model: Permascope MMS from Fischer Technology, Inc., Windsor, Conn.) to be 0.90±0.22 mils (23±5.6 μm).

Example 4

Reaction of Vamac® G with Oleylamine and
N-(3-Aminopropyl)diethanolamine

A 250 mL, 3-neck round bottom flask was equipped with a condenser, thermocouple, nitrogen adapter, stopper, glass stirrer bearing with grease cup, a glass stir-shaft, and an egg-shaped Teflon® stir blade (width: 1.9 cm, length: 5.7 cm). An addition funnel was used to add the amines, and a Dean Stark trap was used to collect water and methanol. The flask was heated using a stirred oil bath.

Vamac® G ethylene acrylic elastomer was cut into small pieces and 20 g was added to the flask. MIBK (54.468 g) was added to the flask, which was then placed in an oil bath heated to 80° C., while the reaction mixture was stirred at 200 rpm under nitrogen. The solids dissolved to give a hazy solution in about 80 min. The solution was then cooled with stirring under nitrogen. DABCO (0.173 mol, 19.388 g) was weighed into a bottle and MIBK (20 g) was added. The bottle was shaken to slurry the contents, which were added to the flask using a funnel. The bottle and funnel were rinsed with additional MIBK (15 g) and the rinses were added to the flask. Stirring was increased to ~400-500 rpm and the resulting mixture was stirred for about 20 min with the pieces of the Vamac® G ethylene acrylic elastomer dissolving within 5-10 min to give a cloudy white solution. Oleylamine (0.1383 mol, 36.987 g) and N-(3-aminopropyl)diethanolamine (0.1383 mol, 5.608 g) were added using the addition funnel over 10-13 min (~2 drops/sec). The solution temperature was initially 35° C., but increased by ~6° C. due to an exotherm. The solution was stirred at room temperature overnight. Then, the solution was stirred at ~400 rpm under nitrogen while heating the oil bath to ~140° C. and collecting liquid in the Dean Stark trap. The oil bath temperature was raised in steps to 160° C. and held for ~30 min before lowering the oil temperature to 140° C. Heating at 140° C. was then continued for 8.5 hr. The solution was stirred at room temperature overnight. Methanolic HCl (500 mL, 0.25%) was placed in a blender (Waring, New Hartford, Conn.) and a 40 g portion of the reaction mixture was added under high speed sheer/agitation. Liquid was decanted and the remaining white rubbery material was scraped out. This process was repeated for the other ~40 g portions of the reaction mixture. The combined solids were dried under vacuum for 2-3 hr to give a yellowish rubbery material (~33 g), which was further purified by dissolving in minimal tetrahydrofuran (60 g) with heating (40-50° C.) over about 2 hr. The solution was cooled and the solids precipitated by adding four 20-30 g portions of the solution to a blender containing 500 mL of water and scraping out the white rubbery material formed after each precipitation. The combined solids were dried for ~2-3 hr to give grafted polymer B (~21 g) as a yellowish rubbery material.

Formation of grafted polymer B was verified using $^{13}$C and $^{1}$H NMR, and IR spectroscopic methods. For the IR analysis, the decrease in intensity of the C=O peak at 1738 cm$^{-1}$ and the appearance of amide peaks at 3300 and 1660 cm$^{-1}$ were used to confirm the formation of the functionalized polymer.

Example 5

Dispersion of Grafted Polymer B in Water

Grafted polymer B (7 g), prepared as described in Example 4, was dispersed in a mixture of water (100 g) and acetic acid (0.497 g). The mixture was heated to ~98-99° C. and stirred for ~2.5 hrs. The polymer initially swelled to the volume of the container, then broke up into smaller pieces before finally dispersing. The final pH was ~5. The solution was stirred overnight at room temperature. Stirring overnight appeared to help finish the dispersion as the solution became clearer and more yellowish.

The degree of dispersion was checked by dipping a glass microscope slide (75×25 mm) into the solution and observing for particulates. When dispersed, very few or no small particulates were observed.

Example 6

Cathodic Electrodeposition of Grafted Polymer B

A dispersion of grafted polymer B, prepared as described in Example 5, was filtered through 25 μm filter paper. The cathodic electrodeposition (CED) was performed as described in Example 3. A cold rolled steel (CRS) plate (15 cm×7 cm) was immersed into the dispersion of grafted polymer B. This plate was the cathode (the panel to be coated) and a stainless steel plate was used as an anode. The ratio of the area of the cathode to the area of the anode was 4:1. The cathode to anode distance was 7.6 cm. The temperature of the electrocoating bath was 22° C. The stirring of the electrocoating bath was produced with a 1 inch (2.5 cm) diameter plastic blade centrally located in the 2-gallon (7.6 L) cylindrical coating container. The amperage was set at a maximum value of 0.5 amps. The voltage was increased from 0 to 100 V over a period of 15 sec with a dwell time of 180 sec. The polymer-coated cold rolled steel plate was removed from the bath, rinsed thoroughly under a strong flush of water, hung to dry for 10-15 min; and then baked at 180° C. for 20 min. The polymer film thickness was 0.85±0.10 mils (21.6±2.6 μm).

Example 7

Reaction of Vamac® G with Ethanolamine and 3-(Dimethylamino)-1-propylamine

A 250 mL, 3-neck round bottom flask was equipped with a condenser, thermocouple, nitrogen adapter, stopper, glass stirrer bearing with grease cup, a glass stir-shaft, and an egg-shaped Teflon® stir blade (width: 1.9 cm, length: 5.7 cm). An addition funnel was used to add the amines, and a Dean Stark trap was used to collect water and methanol. The flask was heated using a stirred oil bath.

Vamac® G ethylene acrylic elastomer was cut into small pieces and 20 g was added to the flask, along with MIBK (14.5 g). The flask was placed in an oil bath and heated to 65° C. with stirring at ~200 rpm, under nitrogen. The solids dissolved to give a hazy solution in about 110 min by raising the oil bath temperature to 80° C. The solution was then cooled with stirring under nitrogen. DABCO (0.173 mol, 19.388 g) was added as a slurry in 20 g of MIBK using a funnel. Additional MIBK (20 g) was used to rinse the bottle and the funnel and the rinses were added to the flask. Stirring was increased to ~400-500 rpm and the solution was stirred ~30 min with the pieces of the Vamac® G ethylene acrylic elastomer dissolving within 5-10 min to give a cloudy yellow-tinged solution. Ethanolamine (0.0864 mol, 5.278 g) and 3-dimethylamino-1-propylamine (0.0864 mol, 8.830 g) were added using an addition funnel over ~13 min. The solution temperature was initially 30° C., but increased ~6° C. due to an exotherm. The solution was stirred at room temperature overnight. The solution was then stirred at ~400 rpm under nitrogen while heating the oil bath to ~116° C. The oil bath temperature was raised to 140° C. and liquid was collected in the Dean Stark trap. The oil bath temperature was further raised in steps to 160° C. The total heating time was ~90 min.

Half of the reaction mixture was poured into a blender (Waring, New Hartford, Conn.) containing 500 mL of 2.5% methanolic HCl under high speed sheer/agitation. The liquid was discarded and the white rubbery material was scraped out. This process was repeated with the other half of the reaction mixture. The combined solids were first rinsed with deionized water, then briefly with ethanol, and finally dried under high vacuum for 1-2 days. The pH of the deionized water after the wash was 5-6. The weight of resulting white rubbery material, grafted polymer C, was ~29.7 g.

Formation of grafted polymer C was verified using $^{13}$C and $^{1}$H NMR, and IR spectroscopic methods. For the IR analysis, the decrease in intensity of the C=O peak at 1738 cm$^{-1}$ and the appearance of amide peaks at 3300 and 1660 cm$^{-1}$ were used to confirm the formation of the functionalized polymer.

Example 8

Reaction of Vamac® G with 2-(Ethylamino)ethanol

A 1000 mL flask equipped with a reflux condenser, heating mantle and an overhead stirrer was charged with 49.3 g Vamac® G ethylene acrylic elastomer dissolved in 250 g of toluene under nitrogen. 2-(Ethylamino)ethanol (0.24 mol, 21.21 g) was added, and the solution was refluxed for 24 hr. The solution turned a dark amber color and a black solid was present at the bottom of the flask. The solid was insoluble in toluene, methanol, acetone, water, and methylene chloride. The supernatant formed a uniform amber solution in both methanol and acetone. In water, it formed a lightly colored dispersion of fine particulates. The supernatant was diluted with methanol and concentrated on a rotoevaporator to leave a dark amber "taffy-like" solid, grafted polymer D (41 g, 69% yield). The "blackened" solid from the bottom of the flask was discarded after washing with methanol. The methanol wash was also discarded as waste.

Formation of grafted polymer D was verified using $^{13}$C and $^{1}$H NMR, and IR spectroscopic methods. For the IR analysis, the decrease in intensity of the C=O peak at 1738 cm$^{-1}$ and the appearance of amide peaks at 3300 and 1660 cm$^{-1}$ were used to confirm the formation of the functionalized polymer.

Example 9

Reaction of Vamac® G with Oleylamine and Ethanolamine

Vamac® G ethylene acrylic elastomer (100 g) and methyl isobutyl ketone (MIBK) (437 mL) were placed into a 1 L round-bottomed glass flask equipped with stirring and fitted with a Dean-Stark trap, condenser, and addition funnel. The flask was placed into an oil bath heated to 80-90° C. and stirred at 600 rpm to dissolve the polymer. Then, 1,4-diazabicyclo[2.2.2]octane (DABCO) catalyst (0.767 mol, 86 g) was added, followed by the addition of ethanolamine (0.383 mol, 23.4 g) and oleylamine (0.383 mol, 102.5 g). The flask was heated for 24 hr at 135° C. The solution was cooled and then the product was precipitated in acetonitrile in a blender in 80 g portions. The product was dried under vacuum at room temperature. The resulting material was dissolved in tetrahydrofuran, precipitated in water in a blender in 30 g portions, and dried under vacuum to give grafted polymer E.

Formation of grafted polymer E was verified using $^{13}$C and $^{1}$H NMR, and IR spectroscopic methods. For the IR analysis, the decrease in intensity of the C=O peak at 1738 cm$^{-1}$ and the appearance of amide peaks at 3300 and 1660 cm$^{-1}$ were used to confirm the formation of the functionalized polymer.

Example 10

Dispersion of Grafted Polymer E in Water

Grafted polymer E (40 g), prepared as described in Example 9, and methyl isobutyl ketone (100 mL) were placed into a 500 mL glass flask equipped with stirring. The flask was placed into an oil bath and heated to 70° C. Then, 3-(isocyanatopropyl)triethoxysilane (0.0027 mol, 0.66 g) and an alcohol blocked isocyanate crosslinking resin solution (33.4 g), prepared as described in U.S. Pat. No. 6,207,731 (Col 5, lines 35-51) were added and the mixture was stirred at 70° C. for 30 min. The resulting organic solution was poured into a solution of glacial acetic acid (1.32 g) in distilled deionized water (200 g) in a 1 L stainless steel flask equipped with a high speed dispersion (HSD) blade over a period of 20 min. The solution was stirred at 1600-1800 rpm throughout the addition procedure and for an additional 15-30 min after the addition was completed. Then, the stirring was slowed to 300 rpm and continued overnight until the methyl isobutyl ketone was fully removed, to give an aqueous dispersion of grafted polymer E. The final pH of the dispersion of polymer E was ~7, as indicated by test strips.

Example 11

Cathodic Electrodeposition of Grafted Polymer E

A dispersion of grafted polymer E, prepared as described in Example 10, was filtered successively with 10 and 2.7 µm filter paper. The cathodic electrodeposition (CED) was performed as described in Example 3. A cold rolled steel (CRS) plate (15 cm×7 cm) was immersed into the dispersion of grafted polymer E. This plate was the cathode (the panel to be coated) and a stainless steel plate was used as an anode. The ratio of the area of the cathode to the area of the anode was 3:1. The cathode to anode distance was 7.6 cm. The temperature of the electrocoating bath was 32° C. A 23 mm Teflon®-coated paddle, centrally located in the one liter cylindrical coating container, was used to stir the dispersion of grafted polymer E. The amperage was set at a maximum value of 0.5 amps. The voltage was increased from 0 to 180 V over a period of 15 sec with a dwell time of 120 sec. The polymer-coated cold rolled steel plate was removed from the bath, rinsed thoroughly under a strong flush of water, hung to dry for 10-15 min, and then baked at 205° C. for 20 min. The polymer film thickness was 0.76±0.02 mils (19.3±0.5 µm).

Example 12

Reaction of Vamac® G with Oleylamine and Ethanolamine Using a Batch Kneading Process in a Kneader/Reactor This Example demonstrates the use of a batch kneading process to graft Vamac® G ethylene acrylic elastomer with a mixture of oleylamine and ethanolamine. The reaction was carried out in a 3.0-L kneader/reactor (manufactured by LIST AG; Arisdorf, Switzerland). The reactor is made from grade 316 stainless steel and has a working volume of 2.0 L. The reactor has a jacket which can be supplied with hot oil to heat the reactor's contents up to a temperature of 270° C. The reactor is insulated to minimize heat losses. The reactor contains a 2 inch (5.0 cm) diameter port to allow addition of polymer and other ingredients, the application of vacuum, and purge gas, and a bottom drain port to empty the reactor. The reactor contains an agitator with a central shaft of approximately 1 inch (2.5 cm) diameter with three sets of impellers which protrude in both the axial and radial directions. These impellers intermesh with four sets of stationary hooks/baffles attached to the reactor wall. The moving agitator and stationary baffles provide intensive mixing and kneading action and significant renewal of surface area to enhance grafting reactions and devolatilization of reaction gas/vapor byproducts. The agitator can be turned at speeds ranging from 8 to 56 rpm.

Vamac® G ethylene acrylic elastomer (300 g) was cut into ½ inch (1.3 cm) pieces and placed in the kneader/reactor. The polymer was heated at 70° C. under nitrogen for 50 min and agitated at 8-40 rpm to soften it. A mixture of ethanol amine (1.15 mol, 70.3 g) and oleylamine (1.15 mol, 307.0 g) was added using a high pressure syringe pump (Teledyne Isco, Inc., Lincoln, Nebr.) at a rate of 20 mL/min. The agitation was increased to 56 rpm and the temperature was increased to 110±4° C., and the reactor was purged with nitrogen at 2 L/min. The components were mixed for 3 hr and 20 min at 110±4° C. and 16-56 rpm agitator speed until no separate liquid phase remained in the reactor and the viscosity of the melt had increased. Mixing continued at 123±2° C. for an additional 2.5 hours at 8 rpm. The resulting grafted polymer F was drained from the reactor at 123° C.

Formation of grafted polymer F was verified using $^{13}$C and $^{1}$H NMR, and IR spectroscopic methods. For the IR analysis, the decrease in intensity of the C=O peak at 1738 cm$^{-1}$ and the appearance of amide peaks at 3300 and 1660 cm$^{-1}$ were used to confirm the formation of the functionalized polymer.

Example 13

Reaction of Vamac® G with Oleylamine and Ethanolamine Using a Batch Kneading Process in a Kneader/Reactor The reaction was carried out in the kneader/reactor described in Example 12. Vamac® G ethylene acrylic elastomer (500 g) was cut into ¼-½ inch (0.6-1.3 cm) pieces and placed in the kneader/reactor. The polymer was heated at 70° C. under nitrogen for 50 min and a mixture of ethanol amine (1.92 mol, 117.0 g) and oleylamine (1.92 mol, 512.5 g) was added using a high pressure syringe pump (Teledyne Isco, Inc.) at a rate of 100 mL/min. The mixture was agitated at 8-32 rpm and the temperature was slowly increased to 110±4° C. over 1 hr under nitrogen. The components were mixed for 1 hr and 15 min at 110±4° C. and 8-56 rpm and the reactor was purged with nitrogen at 0.5 L/min. Mixing continued at 120±1° C. for an additional 2 hours at 8-32 rpm. Agitation was stopped and the reactor was slowly cooled to room temperature overnight under nitrogen. The resulting grafted polymer G was removed from the reactor at room temperature.

Formation of grafted polymer G was verified using $^{13}C$ and $^{1}H$ NMR, and IR spectroscopic methods. For the IR analysis, the decrease in intensity of the C=O peak at 1738 cm$^{-1}$ and the appearance of amide peaks at 3300 and 1660 cm$^{-1}$ were used to confirm the formation of the functionalized polymer.

What is claimed is:

1. A polymer comprising:
   a) at least one ethylene segment of structure 1

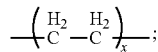

Structure 1 b) at least one substituted ethylene segment of structure 2

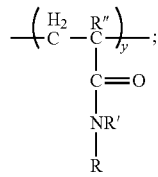

Structure 2 and
   c) at least one substituted ethylene segment of structure 3

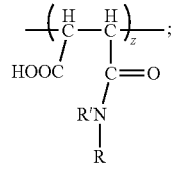

Structure 3 wherein: x and y are integers from 10 to 30,000, and z is an integer from 1 to 10;

R' is H, $-C_qH_{2q+1}$, or $-C_qH_{q-k}$; R" is H or $CH_3$; and
each R is independently at least one member selected from the group consisting of: $-(CH_2)_mN(CH_3)_2$, $-(CH_2)_n-(CH=CH)-(CH_2)_rCH_3$, $-(CH_2)_vCH_3$, $-(CH_2)_pOH$, $-(CH_2)_sN(CH_2CH_2OH)_2$, and $-(CH_2)_tOPO_3H_2$, where q, r, s, t, m, n, v, and p are independently selected from the group of integers from 1 to 20 and k is the number of rings in $-C_qH_{2q-k}$.

2. The polymer according to claim 1, wherein R' is H, and R is $-(CH_2)_mN(CH_3)_2$, $-(CH_2)_n-(CH=CH)-(CH_2)_rCH_3$, and $-(CH_2)_pOH$ in the at least one substituted ethylene segment of structure 2 and the at least one substituted ethylene segment of structure 3.

3. The polymer according to claim 2 wherein m=3, n=8, r=7, and p=2.

4. The polymer according to claim 1, wherein R' is H, and R is $-(CH_2)_n-(CH=CH)-(CH_2)_rCH_3$, and $-(CH_2)_pOH$ in the at least one substituted ethylene segment of structure 2 and the at least one substituted ethylene segment of structure 3.

5. The polymer according to claim 4 wherein n=8, r=7, and p=2.

6. The polymer according claim 1, wherein R' is H, and R is $-(CH_2)_n-(CH=CH)-(CH_2)_rCH_3$, and $-(CH_2)_sN(CH_2CH_2OH)_2$ in the at least one substituted ethylene segment of structure 2 and the at least one substituted ethylene segment of structure 3.

7. The polymer according to claim 6 wherein n=8, r=7, and s=3.

8. The polymer according to claim 1, wherein R' is H, and R $-(CH_2)_mN(CH_3)_2$, and $-(CH_2)_pOH$ in the at least one substituted ethylene segment of structure 2 and the at least one substituted ethylene segment of structure 3.

9. The polymer according to claim 8 wherein m=3, and p=2.

10. The polymer according to claim 1, wherein R' is $-C_qH_{2q+1}$, and R is $-(CH_2)_pOH$ in the at least one substituted ethylene segment of structure 2 and the at least one substituted ethylene segment of structure 3.

11. The polymer according to claim 10 wherein q=2 and p=2.

12. The polymer according claim 1, wherein R' is H, and R is $-(CH_2)_tOPO_3H_2$ in the at least one substituted ethylene segment of structure 2 and the at least one substituted ethylene segment of structure 3.

13. The polymer according to claim 12 wherein t=2.

14. An aqueous dispersion composition comprising:
    a) a polymer of claim 1; and
    b) water;
    wherein said aqueous dispersion composition has a pH of 5.0 to 7.0.

15. The aqueous dispersion composition according to claim 14 further comprising at least one crosslinking agent.

16. The aqueous dispersion composition according to claim 15, wherein the at least one crosslinking agent is a blocked isocyanate.

17. The aqueous dispersion composition according to claim 15, wherein the at least one crosslinking agent is an alkoxysilane.

18. The aqueous dispersion composition according to claim 14 further comprising at least one additive selected from the group consisting of: surfactants, pigments, light stabilizers, anti-crater agents, flow aids, dispersion stabilizers, adhesion promoters, corrosion inhibitors, and fillers.

19. The aqueous dispersion composition according to claim 14 having a pH of 6.0 to 7.0.

20. The aqueous dispersion composition according to claim 14 having a pH of 6.5 to 7.0.

21. A process comprising the steps of:
    a) providing an electrochemical cell comprising:
       i) an aqueous dispersion composition of claim 14;
       ii) a substrate to be coated, wherein the substrate is in contact with the aqueous dispersion composition and the substrate serves as a cathode of the electrochemical cell;
       iii) an anode in contact with the aqueous dispersion composition; and
       iv) a power supply in electrical contact with the anode and cathode; and
    b) applying a voltage between the cathode and the anode to electrodeposit a polymer coating onto at least a portion of the substrate.

22. The process according to claim 21 further comprising the step of: heating the polymer coating.

23. The process according to claim 21 wherein the aqueous dispersion further comprises a crosslinking agent.

24. The process according to claim 21 wherein the aqueous dispersion further comprises at least one additive selected from the group consisting of: surfactants, pigments, light stabilizers, anti-crater agents, flow aids, dispersion stabilizers and fillers.

25. An article produced by the process of claim 21.

* * * * *